United States Patent
Lattard et al.

(10) Patent No.: US 6,748,007 B1
(45) Date of Patent: Jun. 8, 2004

(54) METHOD OF PROCESSING A PULSE RESPONSE WITH AN ADAPTIVE THRESHOLD AND CORRESPONDING RECEIVER

(75) Inventors: Didier Lattard, Rencurel (FR); Jean-René Lequepeys, Fontaine (FR); Didier Varreau, Vif (FR); Mathieu Bouvier des Noes, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 696 days.

(21) Appl. No.: 09/583,746

(22) Filed: May 31, 2000

(30) Foreign Application Priority Data

Jun. 2, 1999 (FR) .............................................. 99 06947

(51) Int. Cl.[7] .............................................. H04L 27/30
(52) U.S. Cl. ........................ 375/142; 375/143; 375/150; 375/152; 375/317; 327/60; 327/68; 455/214; 455/231
(58) Field of Search ................................. 375/141–143, 375/147, 150, 152, 316, 317, 324, 328, 340, 343, 377; 327/50, 58, 60, 62, 68, 72, 90; 455/67.3, 214, 226.2, 226.3, 231

(56) References Cited

U.S. PATENT DOCUMENTS

| 4,635,142 A | * | 1/1987 | Haugland ..................... 360/46 |
| 5,420,850 A | * | 5/1995 | Umeda et al. ............... 370/342 |
| 6,115,429 A | * | 9/2000 | Huang ......................... 375/317 |
| 6,191,576 B1 | * | 2/2001 | Ricks et al. ............. 324/207.2 |

FOREIGN PATENT DOCUMENTS

| EP | 0 615 355 | 9/1994 |
| FR | 2 751 499 | 1/1998 |

* cited by examiner

Primary Examiner—Stephen Chin
Assistant Examiner—Dac V. Ha
(74) Attorney, Agent, or Firm—Oblon, Spivak, McClelland, Maier & Neustadt, P.C.

(57) ABSTRACT

A method of processing a pulse response with an adaptive threshold and corresponding receiver. According to the method, an adaptive threshold is calculated that is a function of a maximum reached by the pulse response, noise, and a coefficient adjustable between 0 and 1. The processing only comes into operation for signals that exceed this threshold. Such a method may find application notably to digital radio-communications with spread spectrum.

5 Claims, 4 Drawing Sheets

METHOD OF PROCESSING A PULSE RESPONSE WITH AN ADAPTIVE THRESHOLD AND CORRESPONDING RECEIVER

TECHNICAL FIELD

The subject of this invention is a method of processing a pulse response with an adaptive threshold and a corresponding receiver. It finds general application in the processing of signals, every time a signal arrives in the form of pulses accompanied by overwritten replicas with noise. This may be the case in seismology, in radar or sonar detection or in the case of digital radio-communications with Direct Sequence Spread Spectrum (DSSS).

STATE OF THE PRIOR ART

The invention will be more specifically described in the context of spread spectrum digital radio-communications, although its scope is wider than this.

The technique of direct sequence spread spectrum consists schematically of multiplying a data symbol (for example one or more bits, by a pseudo-random code made up of a sequence of elements called chips). This operation has the effect of spreading the spectrum of the signal. On reception, the received signal is processed by correlation with a pseudo-random code identical to that used for transmission, which has the effect of reducing ("unspreading") the spectrum. The "unspread" signal is then processed in order to recover the data symbol.

The technique of modulation by direct sequence spread spectrum is widely described in the specialist literature. The following books can be mentioned:

"CDMA Principles of Spread Spectrum Communication" by Andrew J. VITERBI, Addison Wesley Wireless Communications Series, "Spread Spectrum Systems" by Robert C. DIXON, John WILEY and Sons, "Spread Spectrum Communications" by Marvin K. SIMON, Jim K. OMURA, Robert A. SCHOLTZ and Barry K. LEVITT, Computer Science Press, 1983, vol. I.

FIG. 1 appended gives the simplified block diagram for a spread spectrum receiver in the case where a differential type modulation has been used on transmission.

In this Figure, one can see a receiver comprising an aerial 10, a conversion oscillator 12, a multiplier 14, an amplifier 16, a matched filter 18, a delay line 20, a multiplier 22, an integrator 24 and a decision circuit 26.

The operating principle of this receiver is as follows. The matched filter 18 carries out the correlation operation between the received signal and the spread sequence used. The principle of the phase differential modulation, which is sometimes chosen on transmission, leads to data being carried by the phase difference between the signals at the output from the matched filter 18 and at the output from the delay line 20. This data is reconstructed by the multiplier 22.

A correlation peak at the output from the multiplier 22 corresponds to each propagation path. The role of the integrator 24 is to take into account the data carried by each of the propagation paths. The propagation paths being statistically independent in a multiple path environment, with this particular reception technique, diversity processing is carried out, the order of which can be raised when the pulse response is complex. The decision circuit 26 enables one to reconstruct the transmitted data and, in addition, regenerate a clock signal used to command the various circuits.

Document FR-A-2 742 014 describes a digital embodiment of this receiver, which is illustrated in FIG. 2. This receiver comprises two similar channels, one to process part I of the signal in phase with the carrier and the other to process part Q in quadrature with this same carrier.

Channel I comprises filtering means 50(I) matched to the pseudo-random sequence used on transmission; these first means supplying samples $I_k$. Channel I further comprises delay means 60(I), the delay period being equal to the period Ts of the symbols; these means supplying samples $I_{k-1}$.

Channel Q also comprises filtering means 50(Q) matched to the pseudo-random sequence and supplying samples $Q_k$. Channel Q additionally comprises delay means 60(Q), the delay being Ts and supplying samples $Q_{k-1}$.

The multiplier 70 calculates combinations of products of these samples and notably a signal designated below Dot(k) which is equal to $I_k I_{k-1} - Q_k Q_{k-1}$ and a signal designated Cross(k) equal to $Q_k I_{k-1} - I_k Q_{k-1}$. The signals Dot(k) and Cross(k) allow one to calculate the product of a sample $S_k$ obtained at the instant k by the $S_{k-1}$ conjugated sample obtained at the instant t–Ts, where Ts is the duration of the symbols. This calculation is specific to the differential modulation.

The circuit in FIG. 2 further comprises a programming means 72. A decision circuit 90 finally supplies a clock signal H and the reconstructed symbol D (over one or more bits).

By way of an explanatory example, FIG. 3 appended, shows the throughput of a Dot signal obtained by simulation, in the case where only a single propagation path exists between the transmitter and the receiver. Some of the peaks shown are positive, some negative, depending on the value of the binary data transmitted. The interval between two consecutive peaks corresponds to the duration Ts of one symbol.

In the case of Four Phase Shift Keying or DQPSK (Q for quaternary), the two signals Dot and Cross must be examined simultaneously in order to recover the transmitted data. FIGS. 4 and 5 respectively show the throughput of the signals Dot and Cross still provided by simulation in the case of a single path.

In the case of several paths, the peaks illustrated in FIGS. 3 to 5 would be doubles, triples, quadruples etc., for each symbol, the number of peaks detected being equal to the number of paths assumed by the radio wave between the transmitter and the receiver.

A simple integrator, like the integrator 24 in FIG. 1, integrated into the circuit 90 in FIG. 2, integrates all of the signals present, that is to say both the peaks (corresponding to true data) and the noise (that doesn't correspond to any data). The signal to noise ratio is therefore low.

Document FR-A-2 757 330 proposes a solution to improve this signal to noise ratio. It consists firstly of calculating the sum of the squares of the Dot(k) and Cross(k) signals, and then extracting the square root of this sum, a quantity that reflects the energy distribution of the various propagation paths, each peak having as its amplitude, the energy carried by the corresponding path. Hence the quantity E(k) is measured defined as:

$$E(k) = [\text{Dot}(k)^2 + \text{Cross}(k)^2]^{1/2}$$

Next an operation is carried out finding the mean of the energy E(k) over a few symbols, that is to say over a few values from row k. The number of symbols used for this estimation of the mean must correspond to a duration less than the coherence time of the channel, that is to say less than the time beyond which two separate waves from the same origin no longer interfere.

Using these means, designated $E^{moy}$, the instantaneous signals Dot(k) and Cross(k) are weighted, for example, by multiplication of Dot(k) and Cross(k) by $E^{moy}$. In this way, two new weighted signals are obtained, namely $Dot(k)^{moy}$ and $Cross(k)^{moy}$. It is on these weighted signals reflecting the average of the energy of several symbols, that one then carries out the integration over a period Ts for the symbol and then the regeneration of the clock and the recovery of the data.

While this known technique gives satisfaction in certain regards, it nevertheless has the disadvantage of taking the noise into account even though it may be slight. Furthermore, the integration carried out on the pulses prevents the determination of the number of paths present.

SUMMARY OF THE INVENTION

The purpose of this invention is to remedy these disadvantages by allowing one to discard the noise and keep the identity of the paths.

To this end, the invention proposes that a threshold is determined starting from which the signal will be used in subsequent processing. Those skilled in the art would be inclined to choose a fixed threshold, determined once and for all. However, the value of the threshold would often be inappropriate. In effect, depending on the transmission conditions, the amplitude of the main peak can be subject to great variations and the same is true for the mean noise level. For example, in the field of rail transport, communications by spread spectrum are used between the front and the rear of the train to transmit command and control signals. In a rural area and on a relatively sharp curve, a transmitter and receiver are in direct line of sight and there is therefore a single path of high amplitude. However in a tunnel having a curve, the only paths existing correspond to the reflection from the walls of the tunnel; they are numerous and of low amplitude.

Furthermore, although communication by spread spectrum is relatively robust in relation to interference from transmitters operating on the same frequencies, this induces a reduction in the peaks and an increase in noise. To once more use the example of a train, it may travel through rural and urban areas, in tunnels and in areas crossed by other trains and providing interference. These great variations in the environment lead to large variations in pulse response.

For all these reasons, a fixed threshold would not be advisable. Hence the invention proposes that a threshold be determined which is matched to the signal and to the noise. In other words the threshold is adaptive. Adaptation is carried out through a measurement of the maximum achieved by the signal and by the mean noise value.

To put it more precisely, the subject of this invention is a method of processing a pulse response made up of several successive pulses overwritten with noise, characterized in that, in a preliminary process, the value of the maximum of the pulses within a defined period of time and the value of the mean noise within this interval are determined, an adaptive threshold equal to a function of the maximum and of the mean noise is calculated, the pulses received are compared with this threshold and only those pulses that exceed this threshold are taken into account when processing the signal.

Preferably, the adaptive threshold is taken as being equal to the quantity $B+\alpha(M-B)$ where M is the value of the maximum of the pulses, B is the value of the mean noise and $\alpha$ is a coefficient adjustable between 0 and 1. In this way a threshold is obtained which increases linearly with the mean noise and with the difference between the signal maximum and the noise.

This method is applicable in an advantageous manner in the case where the signal to be processed is a signal corresponding to data symbols transmitted by spread spectrum, said interval being then equal to the duration of each symbol.

A further subject of the invention is a receiver for direct sequence spread spectrum radiocommunication for implementation of the method which has just been specified.

DESCRIPTION OF PARTICULAR EMBODIMENTS

Figure 6:
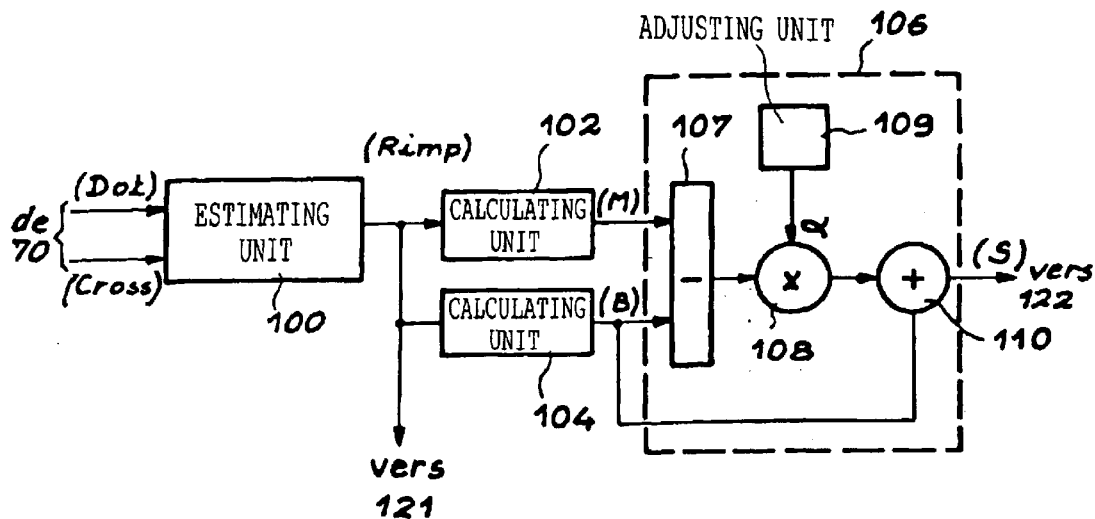
FIG. 6 shows the means of calculating the adaptive threshold according to the invention.

FIG. 6 illustrates an embodiment of the means capable of calculating an adaptive threshold. This embodiment corresponds to a receiver as described in the document FR-A-2 757 330 already mentioned, where Dot and Cross signals are available. The circuit shown comprises means 100 of estimating the pulse response (Rimp), these means receiving the Dot and Cross signals. In addition, it comprises means 102 of calculating the maximum M of the pulse response Rimp within a time interval equal to a symbol period Ts. These means may comprise a comparator and a register for storing the maximum value, this calculation being carried out once per symbol. The circuit shown further comprises means 104 of calculating the mean noise B within the interval Ts. The circuit in FIG. 6 finally comprises a circuit 106 for calculating an adaptive threshold S which is a function of M and B. In the variant illustrated, this circuit comprises a subtractor 107 that receives M and B, a multiplier 108 for multiplying by a coefficient $\alpha$ fixed by an adjustable means 109, this subtractor therefore supplying the quantity $\alpha(M-B)$ and an adder 110 supplying the quantity $B+\alpha(M-B)$ constituting the threshold S.

Naturally, different thresholds could be calculated by using the quantities $\beta B+\mu M$ or even non-linear functions of B and of M.

Figure 1:
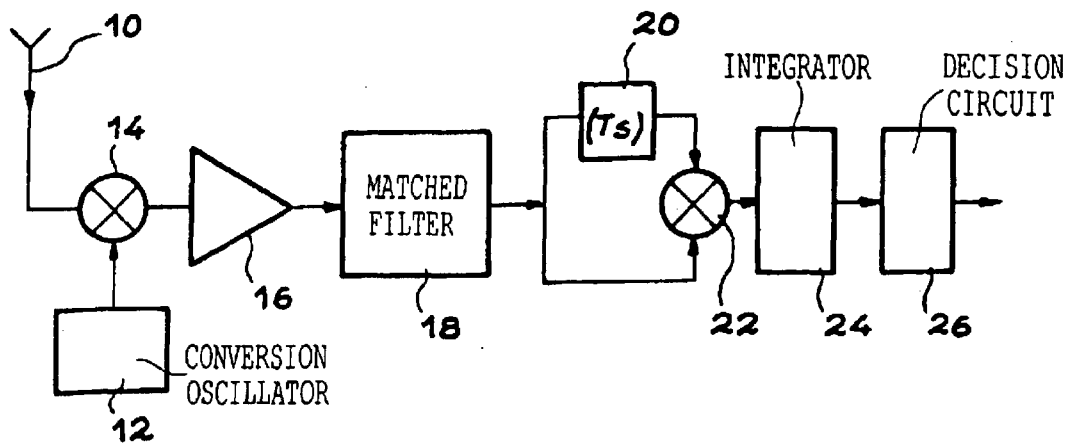
FIG. 1, already described, illustrates a known receiver for differential transmission with direct sequence spread spectrum.
Figure 2:
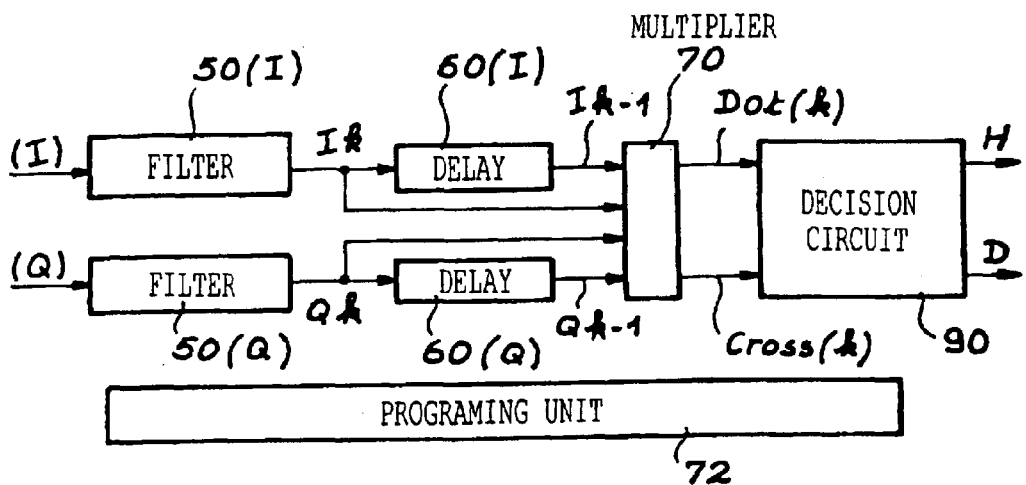
FIG. 2, already described, illustrates a known digital circuit.
Figure 3:
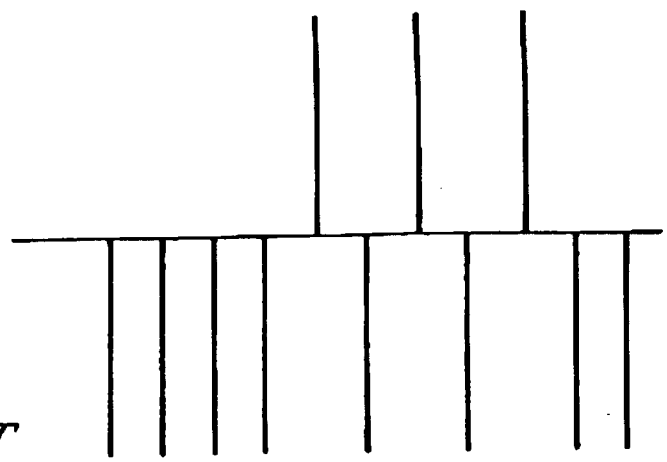
FIG. 3, already described, shows the throughput of a Dot signal in the case of a differential two phase shift keying modulation (DPSK)
Figure 4:
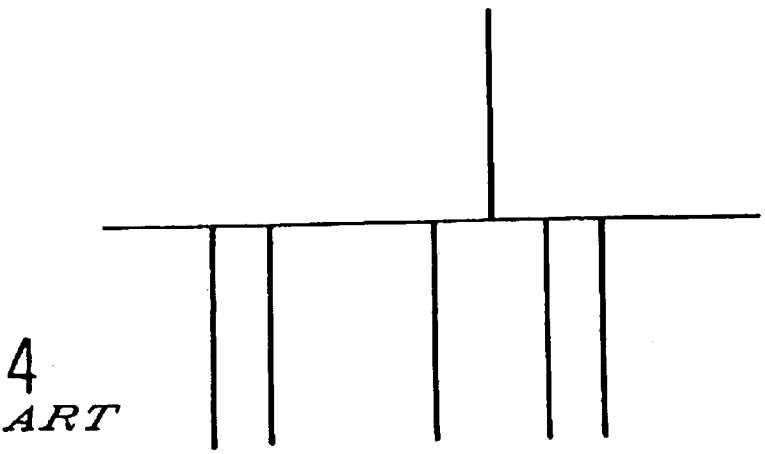
FIG. 4, already described, shows the throughput of a Dot signal in the case of a differential four phase shift keying modulation (DQPSK)
Figure 5:
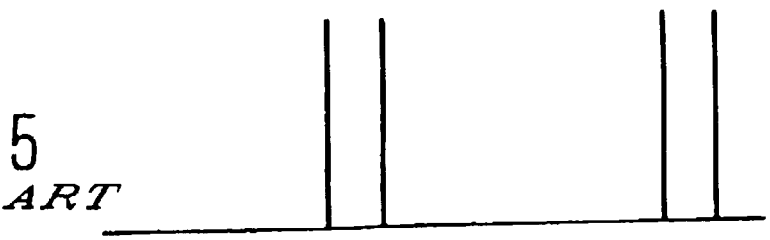
FIG. 5, already described, shows the throughput of a Cross signal in the case of a differential four phase shift keying modulation (DQPSK)
Figure 7:
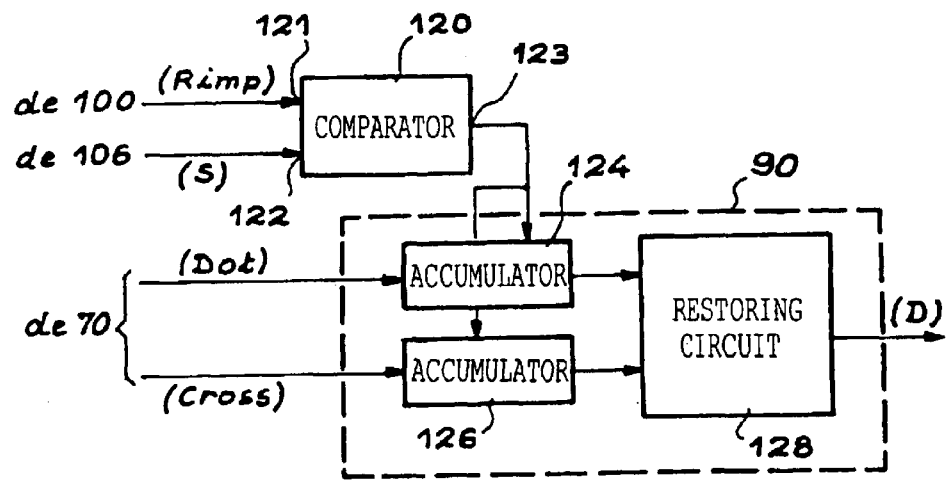
FIG. 7 shows a part of a receiver with spread spectrum using an adaptive threshold.

FIG. 7 shows the means to be added to a receiver such as the one in FIG. 2, in order to implement the invention. These means are constituted by a comparator 120 with a first input 121 connected to the means for estimating the pulse response 100 in FIG. 6 and for receiving the signal Rimp, and a second input 122 connected to the circuit 106 for calculating the adaptive threshold and for receiving the threshold value S. The comparator 120 has an output 123 which commands the accumulation means 124, 126 arranged in the general circuit 90 (cf. FIG. 2). These accumulators respectively receive the Dot and Cross signals (coming from means 70 in FIG. 2) and integrate the energy carried by the group of paths. If the pulse response Rimp exceeds the threshold S, then the Dot and Cross signals are added to their respective accumulators, if not, the contents of the accumulator are not modified (D).

At the end of accumulation, the circuit 128 restores the single bit (in DPSK modulation) or the two bits (in DQPSK) of the received symbol.

As an explanatory example, it can be shown that:

- to calculate the mean noise, an accumulator can be used that sums the pulse response signal during 1024 samples. At the end of accumulation, the mean noise corresponds to the value of the accumulator divided by 1024; this estimation of the noise is carried out again every 1024 samples;
- the signals coming from the differential demodulation (Dot and Cross) can be signed and encoded as a complement to 2 out of 11 bits;
- the estimation signal of the pulse response (Rimp) is positive and can be encoded on 10 bits;
- the parameter $\alpha$, introduced into the circuit in configuration phase, can be encoded on 5 bits; the interval of definition of the threshold (M−B) is therefore divided into 32 directly addressable sub-intervals.

Figure 8:
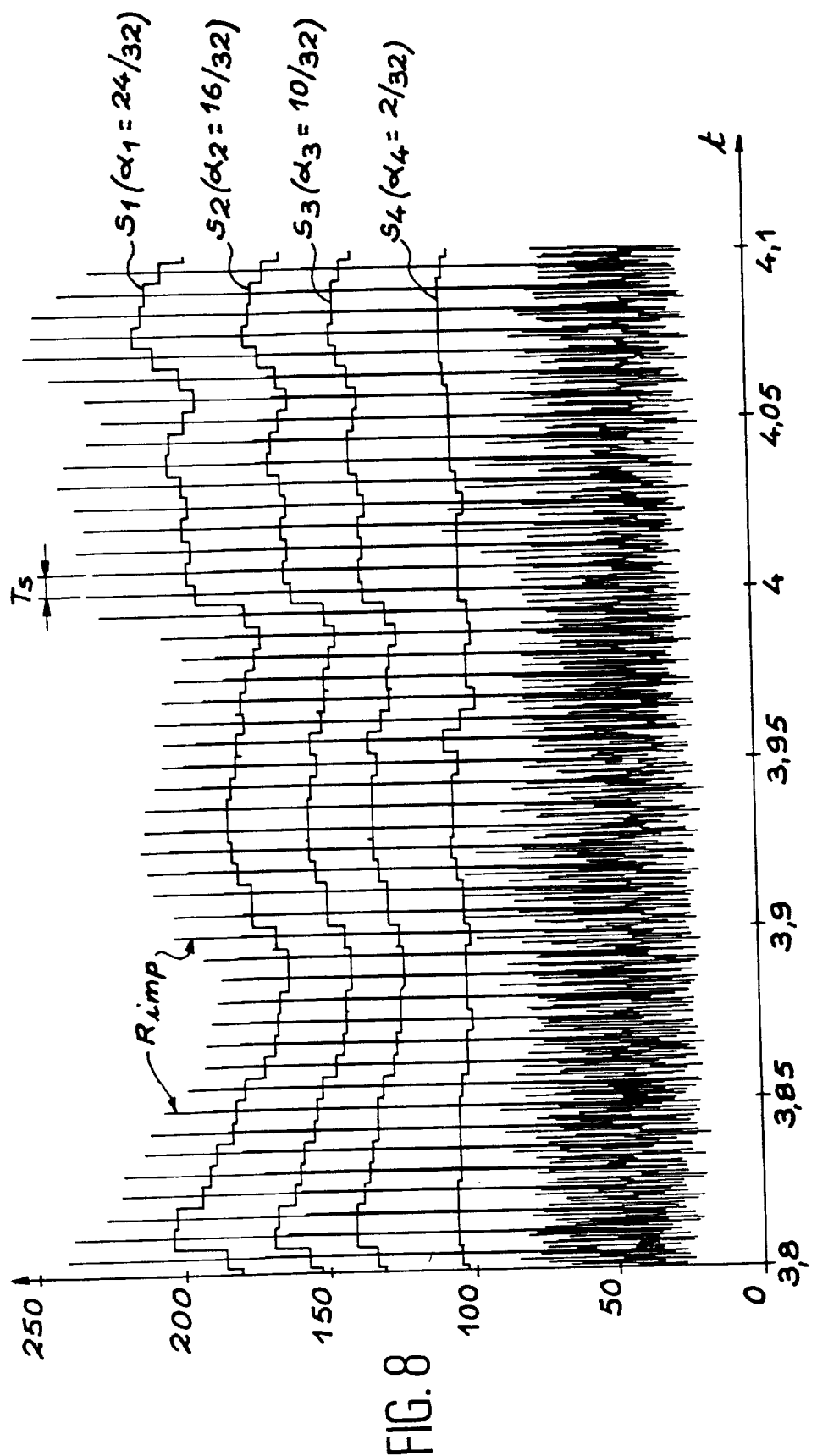
FIG. 8 shows an example of an adaptive threshold for four values of the coefficient $\alpha$.

Finally, FIG. 8 shows four examples of an adaptive threshold $S_1$, $S_2$, $S_3$ and $S_4$ corresponding to four different values of the coefficient $\alpha$, respectively $\alpha_1=24/32$, $\alpha_2=16/32$, $\alpha_3=10/32$ and $\alpha_4=2/32$ (the value 32 coming from the fact that the coefficient $\alpha$ is encoded on 5 bits). FIG. 8 also shows the pulse response, formed by a series of vertical lines separated by a time interval Ts equal to the duration of one symbol. FIG. 8 also shows the noise. It may be clearly seen from this Figure, how the threshold is adapted to the received signal and to the noise. When the coefficient $\alpha$ used is close to one ($\alpha=\alpha_1=24/32$), the threshold is close to the maximum M of the peaks so that, in general, only one single path is retained for the processing of the subsequent signal. When $\alpha$ is small ($\alpha=\alpha_4=2/32$), the threshold is close to the noise and numerous paths can be taken into account. The means 109 in FIG. 6 enable the value of $\alpha$ to be adjusted to the most appropriate value depending on the desired aims.

What is claimed is:

1. A method of processing a pulse response made up of plural successive pulses overwritten with noise, comprising:
   in a preliminary process, determining a value of a maximum amplitude of the pulses within a defined period of time and a value of a mean noise within the defined period of time;
   calculating an adaptive threshold equal to a function of the maximum amplitude and of the mean noise;
   comparing the pulses received with the threshold and only those pulses that exceed the threshold are taken into account to carry out processing of the signal,
   wherein the adaptive threshold is taken to be equal to quantity B+$\alpha$(M−B) where M is the value of the maximum amplitude, B is the value of the mean noise, and $\alpha$ is a coefficient adjustable between 0 and 1.

2. Method according to claim 1, wherein the signal to be processed is a signal corresponding to data symbols transmitted by spread spectrum, the defined period of time being equal to a duration of each symbol.

3. Method according to claim 2, wherein the processing consists of an accumulation of pulses followed by taking of a decision, the accumulation only being effective for the pulses that exceed the threshold.

4. Receiver for direct sequence spread spectrum radio-communications, for implementation of the method according to claim 2, the receiver comprising: correlation means configured to supply correlation peaks; means for processing the correlation peaks to supply signals that permit demodulation of the signal; means for accumulation and decision means for restoring a symbol of data; means for estimating the pulse response; means for calculating the maximum of the pulse response within a time interval equal to a period for the symbols; means for calculating the mean noise in this interval; a circuit to calculate an adaptive threshold, a function of the maximum and of the mean noise; a comparator with a first input connected to the means for estimating the pulse response and second input connected to the circuit for calculating the threshold, the comparator having an output that commands the accumulation means.

5. Receiver according to claim 4, wherein the circuit for calculating the adaptive threshold comprises means for calculating the quantity B+$\alpha$(M−B) where M is the maximum, B is the value of the mean noise and $\alpha$ is a coefficient adjustable between 0 and 1.

* * * * *